MAGNETIC TAPE MACHINE

Filed Nov. 22, 1957 5 Sheets-Sheet 1

INVENTORS
Robert M. Brumbaugh
Walter J. Cheney
BY
ATTORNEYS

INVENTORS
Robert M. Brumbaugh
Walter J. Cheney
BY
[signature]
ATTORNEYS

MAGNETIC TAPE MACHINE

Filed Nov. 22, 1957 5 Sheets-Sheet 3

INVENTORS
Robert M. Brumbaugh
Walter J. Cheney
BY
Flehr & Swain
ATTORNEYS

Jan. 22, 1963 R. M. BRUMBAUGH ETAL 3,074,661

MAGNETIC TAPE MACHINE

Filed Nov. 22, 1957 5 Sheets-Sheet 4

INVENTORS
Robert M. Brumbaugh
Walter J. Cheney
BY
Fleher and Swain
ATTORNEYS

INVENTORS
Robert M. Brumbaugh
Walter J. Cheney
BY
Flehr & Swain
ATTORNEYS 3,074,661
MAGNETIC TAPE MACHINE Robert M. Brumbaugh, Menlo Park, and Walter J. Cheney, San Mateo, Calif., assignors to Ampex Corporation, Redwood City, Calif., a corporation of California Filed Nov. 22, 1957, Ser. No. 698,118
2 Claims. (Cl. 242—55.12)

This invention relates generally to magnetic tape machines such as are used for various record and/or playback operations.

In certain types of magnetic tape machines suitable for such applications as collators or computers, it is desirable to drive the tape with precise rapid start and stop action, in response to the application of control pulses. Assuming that the reels upon which the tape is wound are driven by motors to supply and take up the tape, special means must be employed to control the motors whereby the tape is reeled and unreeled in such a manner as to accommodate the rapid start and stop action, without undue tape slack or tension. Such means generally involves an arrangement for the maintenance of tape loops between the tape driving means and the reels, together with means such as photocell circuitry for controlling the motors in response to changes in the lengths of the loops. An important aspect of such magnetic tape machines is the manner in which the tape is engaged for feeding at a desired speed, with rapid start and stop action. Assuming that one or more tape driving capstans are employed against which the tape is pressed by a pinch or clamping roller, the use of conventional spring means for maintaining a desired clamping pressure has certain disadvantages. Particularly the clamping pressure may be such that appreciable slippage tends to occur, which introduces errors in the recording and/or playback operations. Also the use of conventional spring or like means for initiating and maintaining clamping pressure does not provide the positive and rapid clamping action desired. A further difficulty with such conventional devices is that when the clamping roller is moved away from the capstan to release the tape from driving engagement, the tape may not be stopped with sufficient rapidity and accuracy as is desired.

In general it is an object of the present invention to provide a magnetic tape machine of the above character, having improved tape transport means, and which in particular makes possible precise rapid start and stop operations.

Another object of the invention is to provide a machine of the above character having novel means for maintaining tape loops in the portions of the tape extending between the tape driving means and the tape reels, and for sensing the length of such loops for controlling the tape driving motors.

Another object of the invention is to provide a machine of the above character in which the tape loop sensing means makes use of varying degrees of pneumatic suction.

Another object of the invention is to provide a machine of the above character having novel electronic means for controlling the torque motors.

Another object of the invention is to provide a novel tape driving means for machines of the above character, which is capable of rapid start and stop action, and which does not rely upon the tension of a spring or solenoid means.

Another object of the invention is to provide tape driving means having provision for braking the tape against further movement, when the clamping roller is disengaged with respect to the tape.

Another object of the invention is to provide novel capstan drive means in which the clamping roller for pressing the tape against the driving capstan is operated with rapid snap action.

Another object of the invention is to provide novel circuitry for operating the tape driving means.

Additional objects and features of the invention will appear from the following description in which the preferred embodiment has been disclosed in conjunction with the accompanying drawing.

Referring to the drawing.

In general the present invention makes use of pneumatic suction means for maintaining tape loops between the capstan driving means and the tape reels. Under different operating conditions the tape loops vary in length. Sensing means operated in accordance with such variations serves to control the motors for driving the reels. Novel electrical means is employed for controlled energization of the motors. A novel type of tape driving means provides the desired rapid precise start and stop operations, and this means is responsive to application of controlling pulses.

Figure 1:
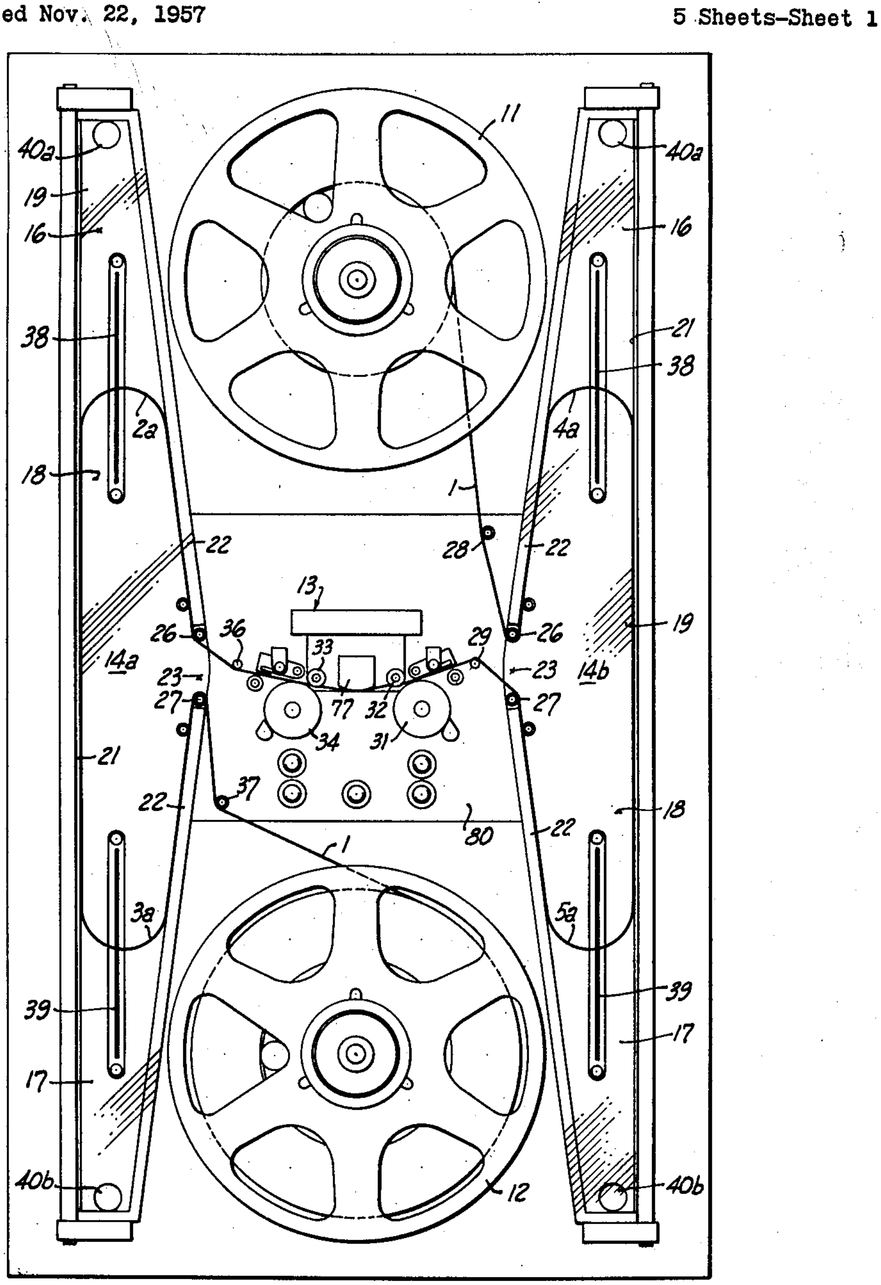
FIGURE 1 is a side elevational view illustrating a machine in accordance with the present invention.

The machine illustrated in FIGURE 1 consists of the tape reels 11 and 12 upon which the tape is wound. These reels are mounted upon suitable turntables driven by electric motors. The tape driving means 13 betwen the two reels engages and drives the tape for either forward or reverse movement, in response to the application of control pulses. The two pneumatic devices 14*a* and 14*b*, on opposite sides of the tape driving means 13, serve to maintain loops in the portions of the tape extending between the driving means 13 and the tape reels.

Each of the devices 14*a*, 14*b* form pockets 16, 17 which serve to accommodate tape loops. In the particular construction illustrated the pockets are defined by a common bottom wall 18, and a front wall 19, which can be hinged as illustrated, and which can be made of suitable transparent material such as plexiglass. In addition the pockets are defined by the common side wall 21, and the two side walls 22, all of which have a width slightly greater than the width of the tape. An opening 23 is formed between the adjacent ends of the two walls 22, to accommodate entrance and removal of the tape. The remote ends of the two pockets are closed to the atmosphere as illustrated. Guide rollers or studs 26 and 27 are provided at the upper and lower ends of the openings 23.

The tape extending between the two reels is threaded for engagement with the drive means 13, and is arranged to provide loops in each of the pockets 16 and 17. Thus in FIGURE 1 the tape extending from reel 11 engages over the stationary guide stud 28, and from thence it is looped over the guide stud 26, and extended upwardly as a loop in the pocket 16. From this pocket the tape extends downwardly to form a loop in the pocket 17, and then upwardly over the guide stud 27 and the guide stud 29 of the capstan driving unit. From thence the tape extends past the driving capstan 31, the guide rollers 32 and 33, drive capstan 34, guide stud 36, and then over the guide stud 26, into the upper pocket 16 of device 14*a*. From the lower pocket of device 14*a*, the tape extends over the guide stud 27, and over the stationary stud 37 to the lower reel 12.

The upper and lower pockets are provided with slots 38, 39, which connect with a suction sensing system, and which open through (and are flush with) the common wall 18.

In FIGURE 1 the tape has been designated by numeral 1, and the various tape loops in the pockets by numerals 2*a*, 3*a*, for the left hand side of the machine, and 4*a*, 5*a*, for the right hand side. The various lengths of these loops for different operating conditions of the machine are within the limits of the slots 38, 39.

Ducts 40*a* and 40*b* communicate with the extremities of the pockets 16 and 17, and connect with pneumatic suction means through a common manifold (not shown).

Figure 6:
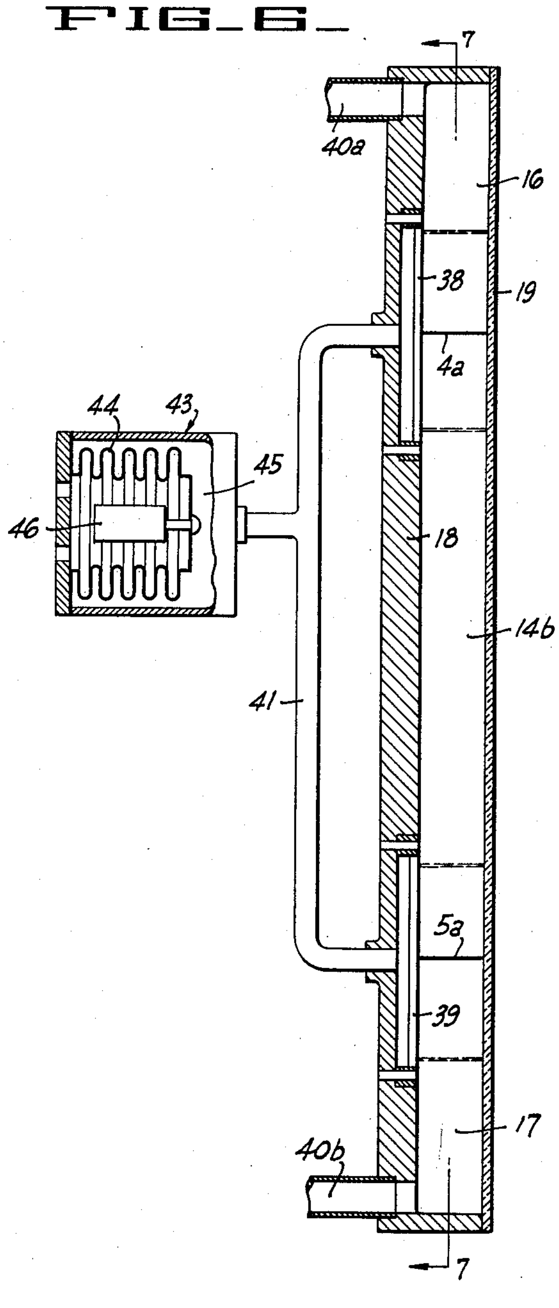
FIGURE 6 is a schematic view in section illustrating two pneumatic pockets for receiving tape loops together with a pneumatic sensing means. It is a section taken along the line 6—6 of FIGURE 7.
Figure 7:
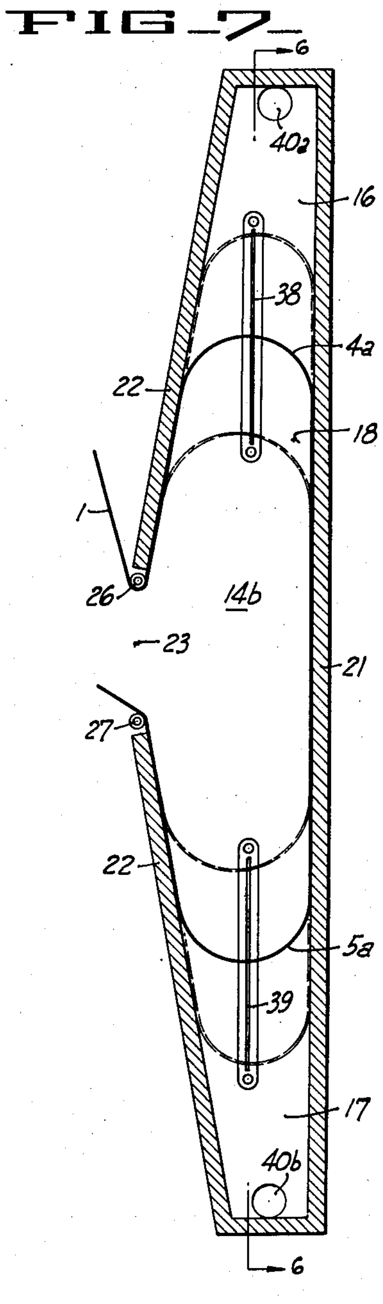
FIGURE 7 is a cross sectional view taken along the line 7—7 of FIGURE 6.

As shown particularly in FIGURES 6 and 7, the pneumatic system associated with the slots 38, 39 can consist of a duct 41 which makes connection with the two slots. A suction sensing device 43 also makes connection with these ducts, and can consist of a bellows 44, having its one side exposed to the atmosphere and its other side exposed to a chamber 45 that connects with the duct 41. The bellows is shown operatively connected with an electro-magnetic transducer 46, such as the movable core of a differential transformer.

Because of continuous evacuation of air through ducts 40*a* and 40*b*, differential pressure is continuously applied to each tape loop in a direction to urge it into its corresponding pocket, whereby the tape is maintained under tension. The corresponding upper and lower tape loops are self-equalizing. Assuming that the upper and lower tape loops 4*a* and 5*a* are of equal overall length, the projected areas of the curved portions of the loops are equal. Under such conditions a constant value of suction in the upper pocket 16 exerts the same linear tension upon the upper tape loop, as the same suction in the lower pocket 17. Assuming, however, that the upper tape loop 4*a* should momentarily be shortened in length without a corresponding change in the lower loop 5*a*, then the projected area of the curved portion of the upper loop is increased, because of the taper between the side walls 21 and 22, with the result that the tension applied to the tape by virtue of the suction in the upper pocket 16, tends to be greater than the tape pull applied by the lower pocket 17. As a result sliding movement occurs between the side wall 21 and that portion of the tape in contact with the same, until the two tape loops are equalized as to length. It will be evident that this equalization feature tends to maintain the upper and lower loops of approximately the same length, and serves to automatically maintain such equalization irrespective of rapid start and stop action of the tape in one direction or the other.

Substantially constant suction continuously applied to the pockets 16 and 17 also applies suction to the chamber 45 of device 43 through slots 38 and 39, and the value of such suction depends upon the lengths of the tape loops. Thus when the upper and lower tape loops on one side of the machine vary as to length, in response to different operating conditions, the vacuum in the chamber 45 of the device 43 is correspondingly varied. Assuming that the upper and lower tape loops increase in length, a shorter portion of each slot 38, 39 is exposed to the closed pockets 16, 17, and longer portions are exposed to the atmosphere. As a result, there is a lowering of the suction (i.e. increase in pressure) in chamber 45, which is translated as a change in the setting of transducing device 43. Conversely if the upper and lower loops are shortened substantially in length, a greater portion of each slot 38, 39 is exposed to the closed pockets 16, 17, and the shorter length of each slot is exposed to atmospheric pressure. Thus under such conditions the suction in chamber 45 increases, and this change again affects the device 43. As will be presently explained, such changes in vacuum are used to control the motors which drive the turntables, whereby the tape reels supply and take up tape in such a manner as to tend to maintain the loops at a predetermined intermediate (i.e. null) length.

Figure 4:
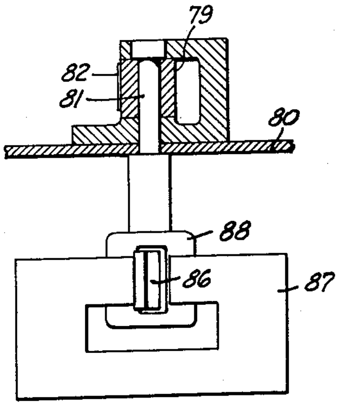
FIGURE 4 is a schematic view likewise showing means for operating the tape clamping rollers.
Figure 5:
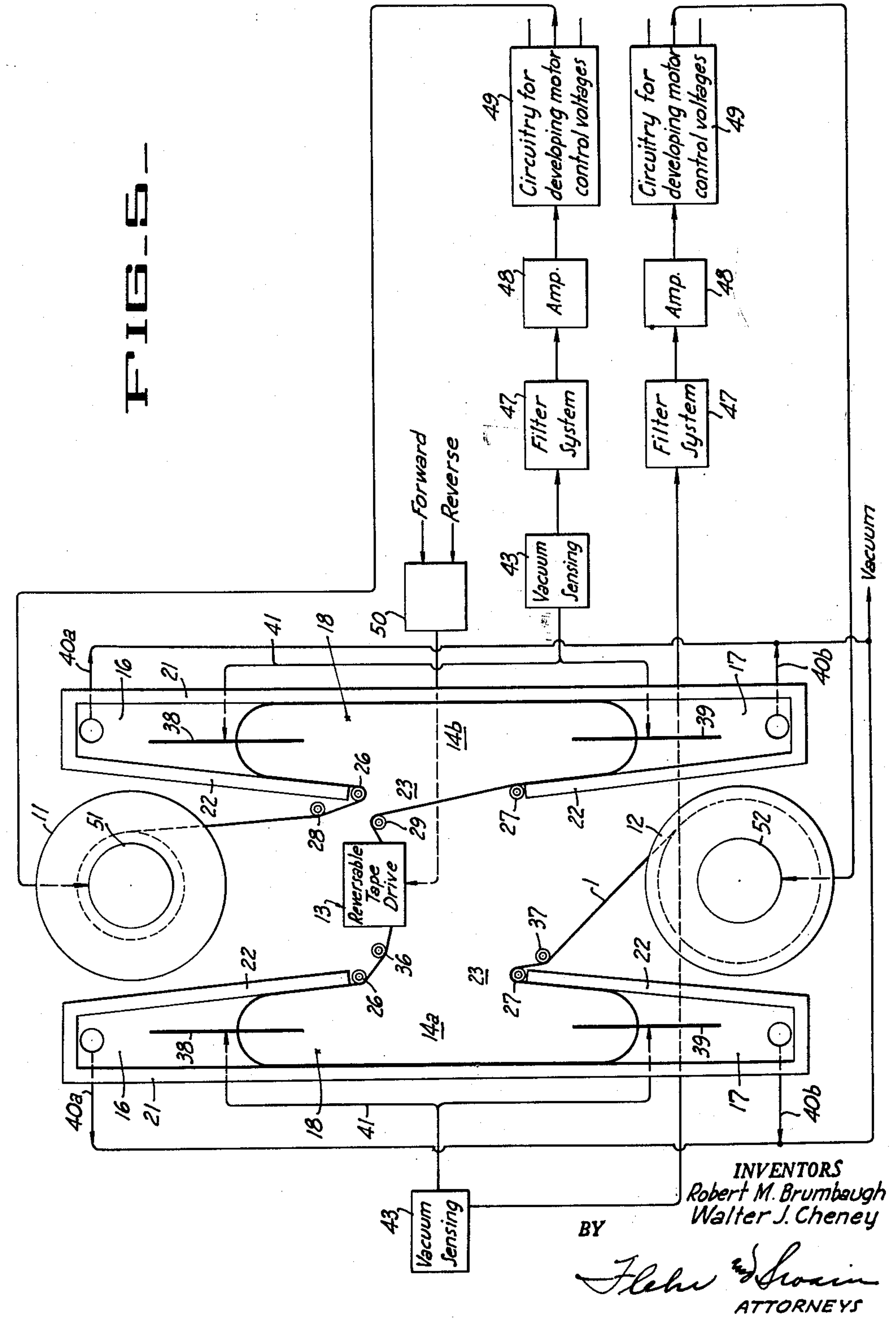
FIGURE 5 is a schematic view illustrating the electronic and other parts of a complete system.

FIGURES 4 and 5 schematically illustrate a complete system in which the two sensing devices 43, for the two devices 14*a*, 14*b*, serve to control the motors for the tape reel turntables. In this instance the output of each vacuum sensing device 43 is applied through stabilizing filter means 47 to the amplifier 48. The output of amplifier 48 is applied to circuitry 49 for developing voltages which energize and control the turntable driving motor 51. The second part of the system which connects with the turntable motor 52, is the same as just described. The electronics 50 is indicated for applying A.C. control voltages to the reversible tape drive means 13.

Figure 9:
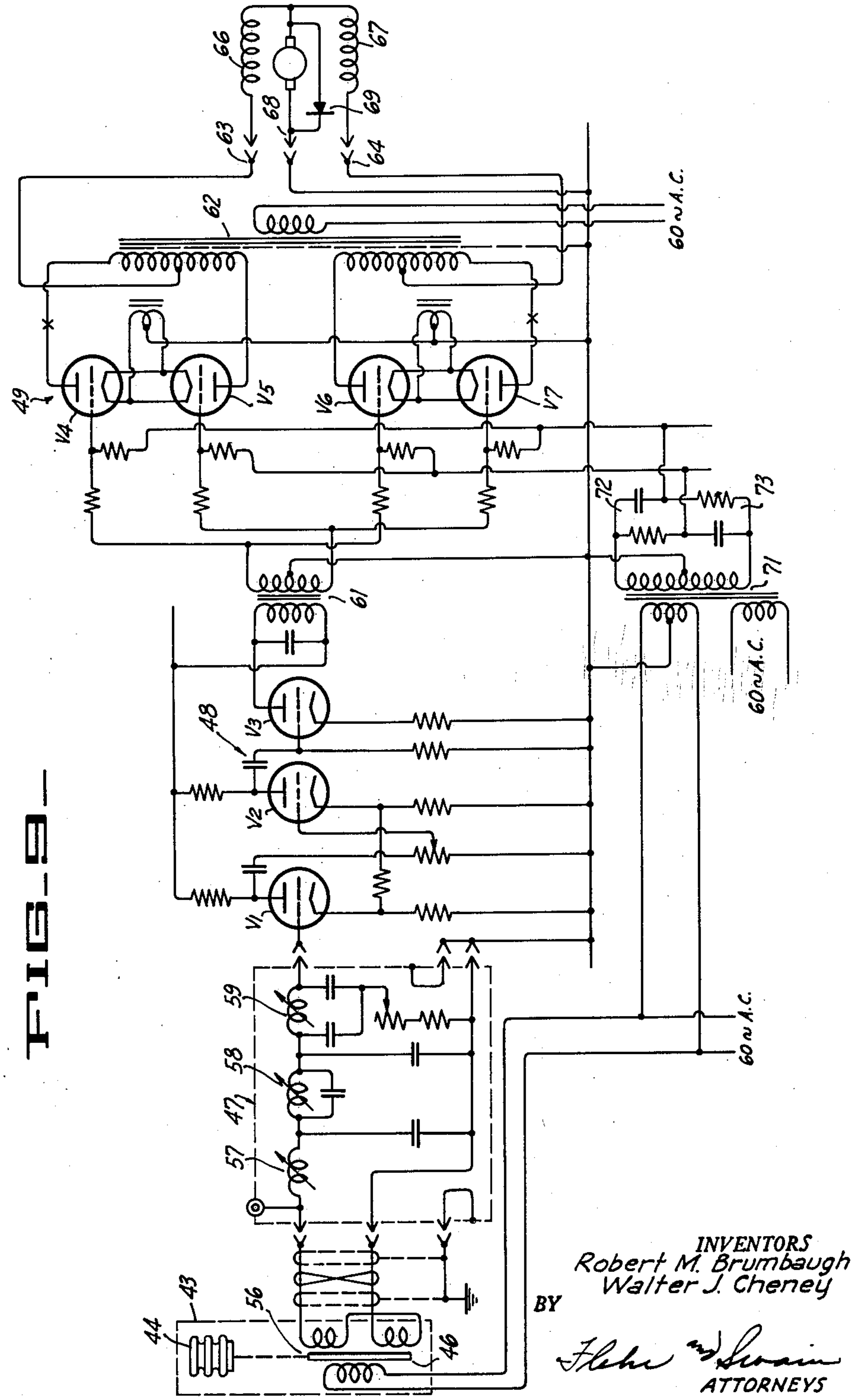
FIGURE 9 is a circuit diagram illustrating electronic means controlled by the pneumatic sensing means and serving to control energization of the turntable motors.

FIGURE 9 illustrates a suitable electronic circuit for the parts 43, 47, 48 and 49. The transducing device 46 in this instance is a differential transformer, having its core 56 movable, and connected to the moving part of the bellows 44. The primary of this transformer connects to a suitable source of alternating current (e.g. 60 c.p.s.). The two secondaries are phased oppositely (i.e. 180° out of phase for null position of 56) and connected in series. The filter system 47 can consist of three sections 57, 58 and 59. Section 57 is a low pass filter, having a cut off above 200 c.p.s. Section 58 is tuned to reject about 180 c.p.s. Section 59 is a rate filter sharply tuned to 60 c.p.s. and capable of passing adjacent side band frequencies. The functioning of these filter sections will be presently described in detail.

Instead of the three section filter system 47 shown in FIGURE 9, it is satisfactory to use two sections, one being a low pass filter having a cutoff above about 100 c.p.s., and a rate filter tuned to 60 c.p.s.

The amplifier 48 can be of the conventional multi-stage vacuum tube type as illustrated. Its output transformer 61 connects with the circuitry 49.

The circuitry 49 makes use of thyratrons V4, V5, V6, and V7, having their plates connected to the two sets of secondary terminals of transformer 62. The primary winding of this transformer is connected to 60 cycle alternating current supply lines. The center taps of the secondaries connect with the output leads 63 and 64, which in turn connect with the torque control windings 66 and 67, of the corresponding turntable motor. A grounded lead 68 also extends to the armature of the motor, and the armature winding is shunted by the rectifier 69.

The control grids of the thyratrons V4–V7 are connected together (through resistors) in pairs, and the two pairs each connected to the secondary terminals of transformer 61. The center tap of the transformer secondary is grounded. One grid of each of the grid pairs is connected through a resistor with the secondary of the biasing transformer 71. This secondary likewise connects through resistors with the other grid of each pair. The connections to the secondary terminals of transformer 71 are through the RC phase shifting circuits 72, 73. The transformer 71 has its primary connected to 60 cycle alternating current supply lines. The alternating potentials provided by transformer 71 under the control grids of the thyratrons are such as to provide a predetermined biasing level corresponding to null position of the transducing device 46, whereby under such null conditions a predetermined and equal level of D.C. excitation is provided for the forward and reverse motor windings 66 and 67.

The complete circuit shown in FIGURE 9 operates as follows: The arrangement is such that for the intermediate null position of the tape loops the core 56 of the differential transformer is positioned whereby the potentials developed across the terminals of the two secondary windings of this transformer are equal in amplitude and 180° out of phase. Therefore zero potential is applied to the input of the filter section 57. Under such conditions no signal is applied to the thyratron circuitry 49 from the transformer 61, and therefore the thyratrons are under the sole control of the biasing potentials from transformer 71. As explained above, under such conditions the plate to cathode current for each of the thyratrons establishes a desired D.C. excitation of the motor windings 66 and 67. Since the excitation of the two windings is equal the motor armature remains stationary. Assuming now that the core 56 is displaced to a new position in one direction or the other, the potentials developed across the secondary terminals of the two secondary windings will differ in amplitude whereby alternating current potentials are applied to the input of filter section 57, such potentials being at a frequency of 60 c.p.s.

Under such unbalanced conditions, harmonic frequencies tend to be present. The filter system 47 rejects such harmonic frequencies and section 59 passes 60 c.p.s. and adjacent side band frequencies. As will be presently explained, under dynamic conditions, side band frequencies constitute a substantial part of the signal. The signal applied to amplifier 49 develops alternating current potentials across the secondary terminals of transformer 61. The potentials are applied to the grids of the thyratrons together with the biasing potentials from the transformer 71. However, the biasing potentials, by virtue of the phase shifting circuits 72 and 73, are out of phase with the signal potentials. The out of phase relationship is more than 90° and somewhat less than 180°. For one pair of the thyratrons, as for example V4 and V5, the resultant bias applied to the grids is such that these tubes are made more conducting, thereby supplying increased (over null condition) direct current excitation to the motor winding 66. Excitation of this winding causes the motor to rotate in a forward direction. At the same time the resultant bias on the control grids of tubes V6 and V7 is reduced from the null or static value, thereby causing the D.C. excitation of winding 67 to be reduced.

Assuming now that the core 56 of the differential transformer is moved to the other side of null position, then alternating current potential is again developed across the input to filter section 57, but 180° out of phase from the potentials developed in the previously assumed out of balance position. The potential developed across the output of transformer 61 is therefore shifted 180° from the previously assumed control signal. Under such conditions, thyratrons V6 and V7 become more conducting whereas thyratrons V4 and V5 become less conducting, and the result is that winding 67 is energized for reverse rotation of the motor, whereas the excitation of winding 66 is reduced.

Under dynamic conditions the control signal is augmented by side band frequencies. Thus assuming that the core 56 is moved rapidly from null position, the effect is virtually to case a modulation of the 60 cycle signal, with production of upper and lower side band frequencies representing a substantial amount of signal energy. The energy of the side band frequencies has the net effect of augmenting the signal applied from the transformer 61, thus providing a more stable servo action.

Figure 2:
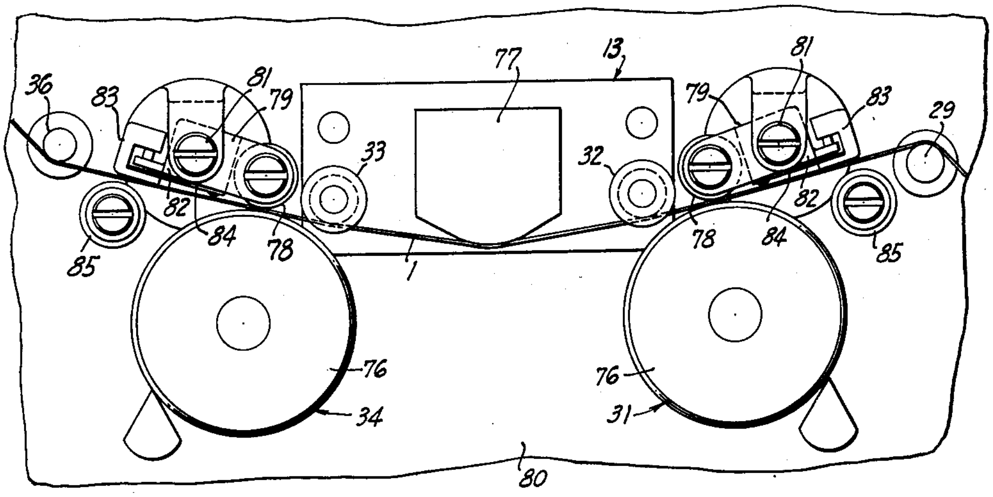
FIGURE 2 is an enlarged detail in front elevation showing the capstan driving means for the tape.

As illustrated particularly in FIGURE 2 two driving capstans 76 are employed, and suitable motor means (not shown) connects with these capstans to drive them at a constant speed in opposite directions. That portion of the magnetic tape extending between the capstans engages the magnetic head 77, which may be of conventional construction. Adjacent each capstan there is a pinch or tape clamping roller 78, rotatably carried by the free end of an arm 79. Each arm is attached to an operating shaft 81, extending to the back side of the mounting panel 80. Novel means connects with the shaft 81 to move the arm 79 between roller clamping and tape release positions. Each arm 79 is provided with a brake extension 82 carrying a friction shoe 83. Normally this shoe is disposed adjacent one side of the magnetic tape, and it is carried by a suitable spring 84. In the region of each shoe and under the other side of the tape there is a stationary stud or post 85, which can be referred to as a stopping or brake post. When the arm 79 is in a position to urge roller 78 into clamping engagement with the tape the shoe 83 is disengaged with respect to the tape. However, when arm 79 is rotated to its tape release position, the shoe 83 by its momentum is momentarily brought into friction engagement with the tape to urge the tape into frictional braking engagement with the post 85.

Figure 3:
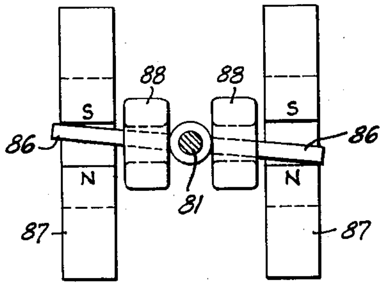
FIGURE 3 is a schematic view illustrating a means for operating tape clamping rollers.

FIGURES 3 and 4 schematically illustrate the electro magnetic means for operating each of the arms 79. The shaft 81 is attached to a magnetic armature 86, the ends of which are disposed within the flux path of the permanent magnets 87. Windings 88 are disposed on the armature 86. Assuming that these windings are connected for separate excitation, then a pulse of one polarity applied to one winding serves to magnetize the armature 86, thus causing it to rotate to a limited position in which its ends are in proximity with magnet poles of dissimilar magnetic polarity. A pulse of opposite polarity applied to the second winding causes the armature to rotate back to the initial position. Discontinuance of a pulse leaves the armature in the position in which it was moved, by virtue of the flux fields of the permanent magnet. This magnetic retention for the limiting positions of the armature 86 is employed to develop the desired clamping force for the roller 78, and is also used to retain the roller and associated arm 79 in the disengaged position of the same. The flux path provided by the permanent magnets also makes for high speed snap action, and in addition provides means responsive to pulses of opposite polarities for driving or stopping the tape.

Figure 8:
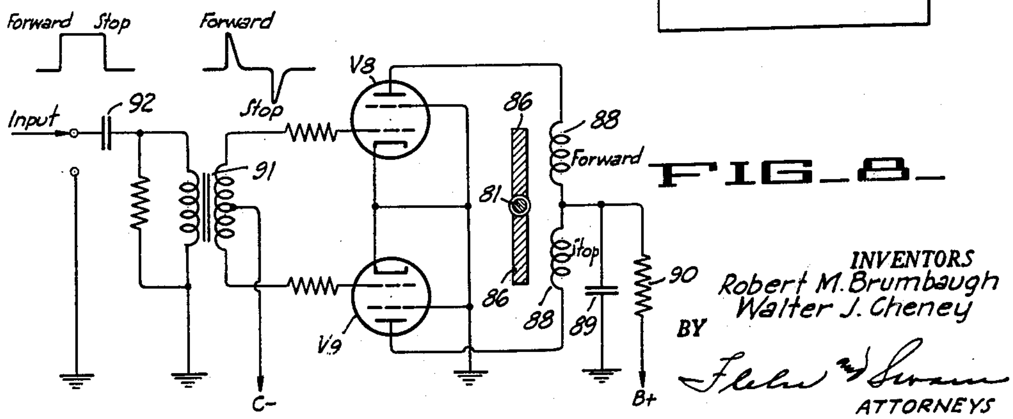
FIGURE 8 is a circuit diagram illustrating electronic means for energizing the means for operating the clamping rollers.

FIGURE 8 illustrates suitable circuitry for energizing the windings 88 in response to applied controlling pulses. The plates of the thyratron vacuum tubes V8 and V9 are connected to terminals of the windings 88. These windings are connected together and to the grounded condenser 89, and to a source of plate current through resistor 90. The control grids of the two tubes are connected through resistors with the secondary terminals of the transformer 91. Controlling signals may be of a square wave form as illustrated, and are applied through coupling condenser 92 to the primary of transformer 91. The length of the signal in this instance determines the time period during which the tape is driven. The wave form on the secondary terminals of transformer 91 will be substantially as indicated or, in other words, will comprise a sharp pulse coincident with the beginning of the control signal, and a sharp pulse of opposite polarity coincident with the termination of the control signal. The control grids of tubes V8 and V9 are negatively pulsed as indicated whereby they are normally nonconducting. When a sharp positive pulse is applied to the control grid of tube V8, this tube is fired whereby current flow occurs from condenser 89 through the corresponding coil 88. Excitation of this coil causes the armature 86 to be moved to a position in which the corresponding pinch roller clamps the tape against the driving capstan. Immediately upon termination of the sharp positive pulse tube V8 is restored to non-conducting state, whereby the current flow through coil 88 returns to zero. However, the armature 86 remains in the tape driving position. When the second sharp pulse is applied to the tubes V8 and V9, tube V9 is fired to energize the other winding 88, and as a result the armature 86 is returned to its tape release position, whereby movement of the tape is arrested.

The circuitry described above is duplicated for the operating means which actuates the pinch roller for the other capstan.

It will be evident from the foregoing that we have provided a magnetic tape machine capable of rapid movement of the tape in either direction, with a quick and precise start and stop action. The use of two loops that are automatically equalized, between the tape driving means and each of the tape reels, permits high speed start and stop operations without danger of undue slack or tape tension.

The pneumatic sensing means which cooperates with the tape loops, makes possible the desired servo action, whereby the rotation of the turntables is controlled in accordance with the lengths of the tape loops. The actuating devices for the tape pinch rollers functions to obtain positive tape drive with a minimum amount of slippage, and with rapid stopping action. The latter takes place with a minimum amount of movement of the tape during the interval commencing with retraction of the pinch roller and ending with momentary braking of the tape. As previously described these characteristics are obtained by virtue of the novel electromagnetic means which retains the pinch roller in tape engaging and release position, and by virtue of the way in which the tape is momentarily braked immediately after the driving of the tape is interrupted. The electronic system used for controlling the turntable means makes for accurate and sensitive servo action with a high degree of stability.

We claim:

1. In a machine of the type in which a pair of tape carrying reels are respectively driven by separate controlled reversible torque motors with a portion of tape extending between the reels engaged by a magnetic head, capstan means engaging said portion of tape to drive the same, vacuum chamber means serving to maintain a pair of tape loops between the capstan means and each of the reels, and sensing means coupled to the vacuum chamber means for detecting the difference in lengths of the pair of tape loops, the combination comprising an adjustable core differential alternating current transformer with the core coupled to the sensing means for movement therewith, said transformer having two windings connected in series-opposition between two terminals and a winding connected to a source of alternating current, and circuit means coupled between the terminals and the corresponding motor for controlling energization of the motor in response to the differential amplitude and phase relationship between potentials at the terminals.

2. A machine as in claim 1 in which said circuit means includes a plurality of gaseous discharge tubes connected to supply a predetermined energization to the motor at zero potential between the terminals and different values of energization to the motor in response to amplitude and phase changes between potentials at the terminals.

References Cited in the file of this patent

UNITED STATES PATENTS

| | | |
|---|---|---|
| 2,547,201 | Fegely | Apr. 3, 1951 |
| 2,590,665 | Williams | Mar. 25, 1952 |
| 2,623,202 | Kronacher | Dec. 23, 1952 |
| 2,686,637 | Dashiell et al. | Aug. 17, 1954 |
| 2,697,807 | Pell | Dec. 21, 1954 |
| 2,708,554 | Welsh et al. | May 17, 1955 |
| 2,713,137 | Few | July 12, 1955 |
| 2,721,076 | Baker | Oct. 18, 1955 |
| 2,745,604 | Masterson | May 15, 1956 |